(12) United States Patent
Taniguchi et al.

(10) Patent No.: US 6,757,693 B2
(45) Date of Patent: Jun. 29, 2004

(54) SYSTEM AND METHOD OF DATA TRANSMISSION/RECEPTION

(75) Inventors: Koji Taniguchi, Kanagawa (JP); Wataru Fujikawa, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 435 days.

(21) Appl. No.: 09/921,721

(22) Filed: Aug. 3, 2001

(65) Prior Publication Data

US 2002/0036804 A1 Mar. 28, 2002

(30) Foreign Application Priority Data

Aug. 4, 2000 (JP) .......................................... 2000-237052
Jul. 19, 2001 (JP) .......................................... 2001-219395

(51) Int. Cl.⁷ .............................................. G06F 17/30
(52) U.S. Cl. ...................................... 707/104.1; 707/10
(58) Field of Search .............................. 707/1, 3, 4, 6, 707/10, 100, 104.1; 345/428, 719; 358/403; 382/100, 305, 307; 715/501.1

(56) References Cited

U.S. PATENT DOCUMENTS 6,400,265 B1 * 6/2002 Saylor et al. ................. 340/531
6,442,573 B1 * 8/2002 Schiller et al. ............ 715/500.1
6,577,311 B1 * 6/2003 Crosby et al. ............... 345/428

FOREIGN PATENT DOCUMENTS

| EP | 986259 | 3/2000 |
|---|---|---|
| EP | 1069715 | 1/2001 |
| EP | 1073223 | 1/2001 |
| JP | 9-288684 | 11/1997 |
| JP | 2000004272 | 1/2000 |
| JP | 2000-59759 | 2/2000 |
| JP | 2000311103 | 11/2000 |
| JP | 2001007840 | 1/2001 |

* cited by examiner

*Primary Examiner*—Diane D. Mizrahi
*Assistant Examiner*—Apu M Mofiz
(74) *Attorney, Agent, or Firm*—RatnerPrestia

(57) ABSTRACT

Disclosed is a system and method of data transmission/reception in which picture signals are encoded into image data, the attribute information of the image data is obtained, meta data are generated from the attribute information of the image data. The image data and the meta data are transmitted separately. With this system and method of data transmission/reception, when predetermined conditions are satisfied, i.e. only when a moving body is detected or abnormal data or data including significant information are detected, image data and meta data are transmitted. Therefore, since not all the data are transmitted, the amount of transmitted data is reduced. As a result, the amount of data accumulated in data recipient can be reduced and the load of data analysis operation can be alleviated. In addition, the burden on an operator visually monitoring image data can be eased. Furthermore, inadvertent failure in checking abnormal data or data including significant information can be prevented.

16 Claims, 16 Drawing Sheets

FIG. 3

```
<?xml version="1.0" encoding="Shift_JIS"?>
<Transmission Data>
  <Terminal Attribute>
    <Terminal Identifier> T001 </Terminal Identifier>
    <Position Information>
      <Latitude> 35.65 N </Latitude>
      <Longitude> 139.29 E </Longitude>
    </Position Information>
  </Terminal Attribute>
  <Instrument Data List>
    <Instrument Data>
      <Data Number> 0085 </Data Number>
      <Date and Time>
        <Date> 2001/06/20 </Date>
        <Time> 13:00 </Time>
      </Date and Time>
      <Air Temperature> 22.5 </Air Temperature>
      <Humidity> 40.0 </Humidity>
      <Wind Direction> Southwest </Wind Direction>
      <Wind Force> 0.5 </Wind Force>
    </Instrument Data>
        :
        :
    <Instrument Data>
      <Data Number> 0090 </Data Number>
      <Date and Time>
        <Date> 2001/06/20 </Date>
        <Time> 13:50 </Time>
      </Date and Time>
      <Air Temperature> 22.3 </Air Temperature>
      <Humidity> 40.5 </Humidity>
      <Wind Direction> Southwest </Wind Direction>
      <Wind Force> 0.7 </Wind Force>
    </Instrument Data>
  </Instrument Data List>
</Transmission Data>
```

FIG. 6

```xml
<?xml version="1.0" encoding="Shift_JIS"?>
<Image Meta Data>
 <Image Attribute Information>
  <Recording Position>
   <Terminal Identifier> T001 </Terminal Identifier>
   <Latitude and Longitude>
    <Latitude> 35.65 N </Latitude>
    <Longitude> 139.29 E </Longitude>
   </Latitude and Longitude>
  </Recording Position>
  <Image Number> 25 </Image Number>
  <Image File Name> T001_25.jpg </Image File Name>
  <Image Size>
   <Width> 320 </Width>
   <Height> 240 </Height>
  </Image Size>
  <Encoding Scheme> JPEG </Encoding Scheme>
  <Recording Date>
   <Date> 2001/06/20 </Date>
   <Time> 13:50 </Time>
  </Recording Date>
 </Image Attribute Information>
 <Image Processing Results>
  <Number of Detected Persons> None </Number of Detected Persons>
 </Image Processing Results>
</Image Meta Data>
```

FIG. 10

```xml
<?xml version="1.0" encoding="Shift_JIS"?>
<Image Meta Data>
 <Image Attribute Information>
   <Recording Position>
     <Terminal Identifier> T001 </Terminal Identifier>
     <Latitude and Longitude>
       <Latitude> 35.65 N </Latitude>
       <Longitude> 139.29 E </Longitude>
     </Latitude and Longitude>
   </Recording Position>
   <Image Number> 25 </Image Number>
   <Image File Name> T001_25.jpg </Image File Name>
   <Image Size>
     <Width> 320 </Width>
     <Height> 240 </Height>
   </Image Size>
   <Encoding Scheme> JPEG </Encoding Scheme>
   <Recording Date and Time>
     <Date> 2001/06/20 </Date>
     <Time> 13:50 </Time>
   </Record Date and Time>
 </Image Attribute Information>
 <Image Analysis Results>
   <Detection of Moving Bodies>
     <Number of Detected Moving Bodies> 1 </Number of Detected Moving Bodies>
     <Amount of Picture Area> 0.2 </Amount of Picture Area>
   </Detection of Moving Bodies>
 </Image Analysis Results>
 <Instrument Data>
   <Infrared Sensor> Responded </Infrared Sensor>
   <Weight Sensor> 50.5 </Weight Sensor>
 </Instrument Data>
</Image Meta Data>
```

FIG. 13

```
<?xml version="1.0" encoding="Shift_JIS"?>
<Image Meta Data>
 <Image Attribute Information>
  <Recording Position>
   <Terminal Identifier> T001 </Terminal Identifier>
   <Latitude and Longitude>
    <Latitude> 35.65 N </Latitude>
    <Longitude> 139.29 E </Longitude>
   </Latitude and Longitude>>
  </Recording Position>
  <Image Number> 30 </Image Number>
  <Image File Name> T001_V30.mp4 </Image File Name>
  <Image Size>
   <Width> 320 </Width>
   <Height> 240 </Height>
  </Image Size>
  <Encoding Scheme> MPEG4 </Encoding Scheme>
  <Bit Rate> 512k </Bit Rate>
  <Recording Start Date and Time>
   <Date> 2001/06/20 </Date>
   <Time> 14:00 </Time>
  </Recording Start Date and Time>
  <Recording Period of Time> 00:03:00 </Recording Period of Time>
 </Image Attribute Information>
 <Instrument Data>
  <Richter Scale> 3 </Richter Scale>
  <Air Temperature> 23.2 </Air Temperature>
  <Humidity> 35.0 </Humidity>
 </Instrument Data>
</Image Meta Data>
```

FIG. 16

```
<?xml version="1.0" encoding="Shift_JIS"?>
<Image Meta Data>
  <Image Attribute Information>
    <Recording Position>
      <Terminal Identifier> T002 </Terminal Identifier>
      <Latitude and Longitude>
        <Latitude> 37.00 N </Latitude>
        <Longitude> 141.30 E </Longitude>
      </Latitude and Longitude>
    </Recording Position>
    <Image Number> 40 </Image Number>
    <Image File Name> T002_V40.mp4 </Image File Name>
    <Image Size>
      <Width> 320 </Width>
      <Height> 240 </Height>
    </Image Size>
    <Encoding Scheme> MPEG4 </Encoding Scheme>
    <Bit Rate> 512k </Bit Rate>
    <Recording Start Date and Time>
      <Date> 2001/06/25 </Date>
      <Time> 15:00 </Time>
    </Recording Start Date and Time>
    <Record Period of Time> 00:02:00 </Record Period of Time>
  </Image Attribute Information>
  <Image analysis Results>
    <Data Recording Time="15:00:00" Number of Moving Bodies="1">
    <Data Recording Time="15:00:30" Number of Moving Bodies="0">
    <Data Recording Time="15:01:00" Number of Moving Bodies="0">
    <Data Recording Time="15:00:30" Number of Moving Bodies="0">
  </Image Analysis Results>
  <Instrument Data>
    <Data Recording Time="15:00:00" Air Temperature="23.0">
    <Data Recording Time="15:00:30" Air Temperature="22.9">
    <Data Recording Time="15:01:00" Air Temperature="22.7">
    <Data Recording Time="15:00:30" Air Temperature="22.8">
  </Instrument Data>
</Image Meta Data>
```

SYSTEM AND METHOD OF DATA TRANSMISSION/RECEPTION

FIELD OF THE INVENTION

The present invention relates to a system and method of data transmission/reception for transmitting/receiving a large amount of data via network.

BACKGROUND OF THE INVENTION

Various monitoring systems are in the actual use to watch an unattended shop or office at night and protect it from suspicious people or invaders or to monitor a place that is dangerous or inaccessible by people. In this kind of monitoring system, a data transmission/reception system of a so-called client-server type is used.

This type of data transmission/reception system is made of at least one data-transmitting terminal and a data-receiving server connected thereto via cable or wireless network.

In this data transmission/reception system, various sensors that detect various states of subjects to be monitored, such as a camera and thermometer, are mounted on its data transmitter. The data collected from such a sensor is transmitted to the data-receiving server. The data-receiving server shapes the data transmitted by the data-transmitting terminal into predetermined formats and accumulates them in its database.

Some patent applications of monitoring systems have been filed. Japanese Patent Application Non-Examined Publication No. H09-288684 discloses a monitoring system that regularly transmits to an image-collecting server image data acquired by a camera disposed at a place to be monitored, and automatically updates image data on a Web page.

European Patent Application EP0986259A2 discloses a structure of a network camera monitoring system having a motion detection means. In this structure, image data are transmitted when the motion detection means detects a moving object.

Japanese Patent Application Non-Examined Publication No. 2000-59759 discloses a monitoring camera system that processes images taken by a monitoring camera, and displays and accumulates the image data only when an abnormality is detected.

Japanese Patent Application Non-Examined Publication No. 2000-4272 shows a data transmission/reception system utilizing meta data and discloses a structure that coverts accumulated meta data into a format suitable for transmission.

In these conventional monitoring systems, the format of the data accumulated in the database is defined as a format inherent in each system and thus general use of the accumulated data is difficult.

The data-receiving server performs analysis (e.g. format conversion) on received data for accumulation in the database. When a large number of data-transmitting terminals that collect different types of data are connected, the data analysis imposes a heavy load on the server.

In addition, when encoded image data are transmitted or received, how to control attribute information attached to the image data, such as the encoding scheme, image size, recording time, recording period of time and imaging position, poses a problem. In a conventional data transmission/reception system, a header including the image attribute information is added to the head of the image, or image attribute information including information linked to the image data is generated and the image attribute information is managed in a database independently of the image data. However, with these methods, the data format having high dependability on the system deteriorates mutual connectivity with other data transmission/reception system.

Furthermore, when a data transmission/reception system is used for remote supervision, a huge amount of image data put a large burden on an operator monitoring the image and make the amount of image data accumulated in the database huge.

SUMMARY OF THE INVENTION

Therefore, it is an object of the present invention to reduce the amount of static image data or motion image data (hereinafter referred to as images generically), alleviate the load on a data-receiving server that accumulates the received data in its database, facilitate the accumulation and search of the image data in the database and ease the burden on an operator monitoring the images.

The system in accordance with the present invention encodes picture signals to generate image data, acquires the attribute information of the image data, generates meta data from the attribute information of the image data, and separates the image data and meta data for transmission.

At this time, the amount of data can be reduced by transmitting image data and meta data only when predetermined conditions are satisfied, for example, a moving body is detected or abnormal data or data including significant information are detected. This can reduce the amount of data accumulated in a data recipient and thus alleviate the load of data analysis. In addition, this can ease the burden on an operator who visually monitors the image data and prevent inadvertent failure in checking abnormal data and data including significant information.

Furthermore, the meta data can be made to less system-dependable text-based data with tags by making them compliant with an extensible data description language specification similar to the eXtensible Markup Language (XML). Therefore, mutual cooperation and exchange of such meta data with other systems are easy.

Inclusion of information acquired by picture analysis operation or instrument data acquired by sensors in the attribute information of the image data allows efficient data analysis and data search of a data recipient.

BRIEF DESCRIPTION OF THE DRAWINGS

FIG. 3 is an example of data made by formatting instrument data acquired by a sensor in accordance with the first embodiment of the present invention.

FIG. 6 is an example of meta data for use in the second embodiment of the present invention.

FIG. 10 is an example of meta data for use in the third embodiment of the present invention.

FIG. 13 is an example of meta data for use in the fifth embodiment of the present invention.

FIG. 16 is an example of meta data for use in the sixth embodiment of the present invention.

DETAILED DESCRIPTION OF THE EXEMPLARY EMBODIMENTS

Exemplary embodiments of the present invention are hereinafter demonstrated with reference to the accompanying drawings.

1. First Exemplary Embodiment

Figure 1:
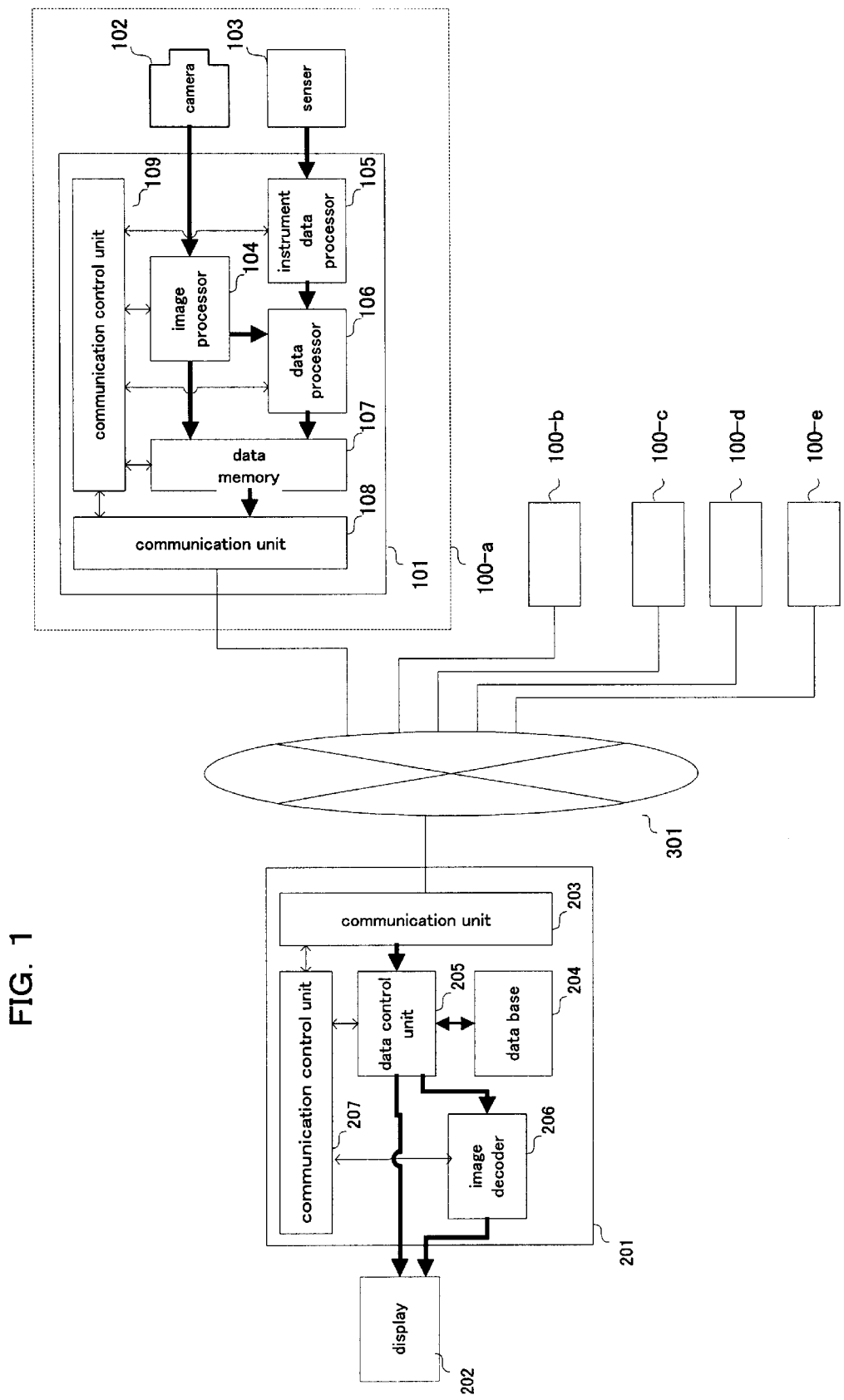
FIG. 1 is a block diagram of a data transmission/reception system in accordance with one embodiment of the present invention.

FIG. 1 is a block diagram of a data transmission/reception system in accordance with the present invention. Data transmitters 100-*a*, 100-*b*, 100-*c*, 100-*d*, and 100-*e* (hereinafter referred to as data transmitter 100 generically) are disposed at different positions, and acquire data of atmospheres at the different positions. Data transmitter 100 is connected to data-receiving server 201 data via network 301. Disposed in a monitoring center, data-receiving server 201 accumulates received data in database 204, an image recording/encoding unit and the like, and reproduces predetermined data on display 202 of a monitor unit and the like. Details are described afterwards. Network 301 allows mutual communication between data-transmitting terminal 101 and data-receiving server 201. The network includes a wide area network (WAN), local area network (LAN), wireless network, and combinations thereof.

Data transmitter 100 is made of data-transmitting terminal 101, camera 102 that is connected thereto and acquires picture signals, and at least one sensor 103 for acquiring various instrument data. Data-transmitting terminal 101 has a general interface capable of connecting to an arbitrary sensor 103. Sensors 103 include a thermometer, hygrometer, seismometer, infrared sensor, weight sensor and so on, each of which is capable of connecting to the general interface and used for intended purposes.

Camera 102 images the atmosphere thereof at the position where the camera 102 is placed and feeds the picture signals into image processor 104. Image processor 104 encodes the picture signals supplied from camera 102 and generates encoded static or motion image data. Encoding schemes of image data are selected for intended purposes, as required. Image formats compliant with the standards can be employed (e.g. JPEG for static pictures, and H.263, MPEG2, or MPEG4 for motion pictures). Image data need not be compressed necessarily. Image processor 104 performs image processing, e.g. analysis for detecting motions of such moving bodies as a person or moving object.

Image processor 104 has functions of outputting the identifier of image data (file name), image format, data size, recording time, recording period of time (for motion pictures) and image analysis results, together with generated image data. Such information accompanying image data is hereinafter referred to as image attribute information. Such image attribute information is fed into meta data processor 106.

On the other hand, sensor 103 measures various physical quantities at the positions to be monitored and feeds measured data into instrument data processor 105. A specific kind of sensors 103 is selected in accordance with the physical quantities to be measured, as required. The instrument data measured at sensor 103 is analyzed in instrument data processor 105, and the instrument data or analysis results thereof are fed into meta data processor 106.

Meta data processor 106 combines the image attribute information and the information linked to image data supplied from image processor 104 with the instrument data supplied from instrument data processor 105 into meta data.

The information linked to image data is an identifier for specifying the image data, such as a file name of the image data, or address information indicating where the image data are. The meta data are data describing data. In this embodiment, the meta data are the image attribute information associated with the image data generated in image processor 104. The instrument data supplied from instrument data processor 105 are included in the meta data because these instrument data are assumed to be the data associated with image data. For example, it is assumed that these instrument data are acquired at the same time as the generation of the image data, or image data are acquired when the instrument data satisfy predetermined conditions.

Meta data can be added to the header of image data. However, adding a header inherent in a system to the head of image data deteriorates general versatility of the image data. Therefore, in the present invention, image data and meta data are separated and the information linked to the image data is included in the meta data in order to maintain the correspondence between the image data and the meta data. As a format of the meta data, a standardized extensible data description language similar to the eXtensible Markup Language (XML) is employed. In other words, meta data processor 106 generates text-based meta data having tags.

Data memory 107 temporarily accumulates image data supplied from image processor 104 and meta data supplied from meta data processor 106, and communication unit 108 sends control messages and data via network 301.

Data memory 107 is not necessarily required. When data memory 107 does not exist, image data supplied from image processor 104 and meta data supplied from meta data processor 106 are delivered directly to communication unit 108.

Communication control unit 109 not only controls the communication between data transmitter 100 and data-receiving server 201 but also each of the units in data-transmitting terminal 101. In addition, the communication control unit 109 can also has a function of outputting to meta data processor 106 various kinds of information to be inserted in the meta data. Concrete examples of various kinds of information include the identifier of data-transmitting terminal 101, the position information of data-transmitting terminal 101 utilizing the global positioning system (GPS).

Data transmitting-terminal 101 can be structured so as to transmit no image data and only instrument data measured at sensor 103. In this case, meta data processor 106 does not generate meta data and formats the instrument data to be transmitted.

Next, the monitoring center is described below. The monitoring center has data-receiving server 201 and display 202 placed therein. Display 202 is connected to data-receiving server 201 and displays the text data and image data supplied from data-receiving server 201 so that the data are monitored.

Data-receiving server 201 receives control messages and data at communication unit 203 via network 301. The received data are classified in data control unit 205, where meta data are decoded. The image data and meta data are accumulated in database 204 and fed into image decoder 206. Data control unit 205 also has a function of outputting image data and meta data that have been converted into a user-readable format.

Image decoder 206 decodes the image data supplied from data control unit 205 and feeds the data into display 202. Communication control unit 207 controls communication unit 203, database 204, data control unit 205 and image decoder 206, each of which constitutes data-receiving server 201, and controls communication with data transmitter 100.

The main function of data-receiving server 201 is accumulation and control of image data and meta data. Thus, display 202 and image decoder 206 are not essential components of data-receiving server 201.

Figure 2:
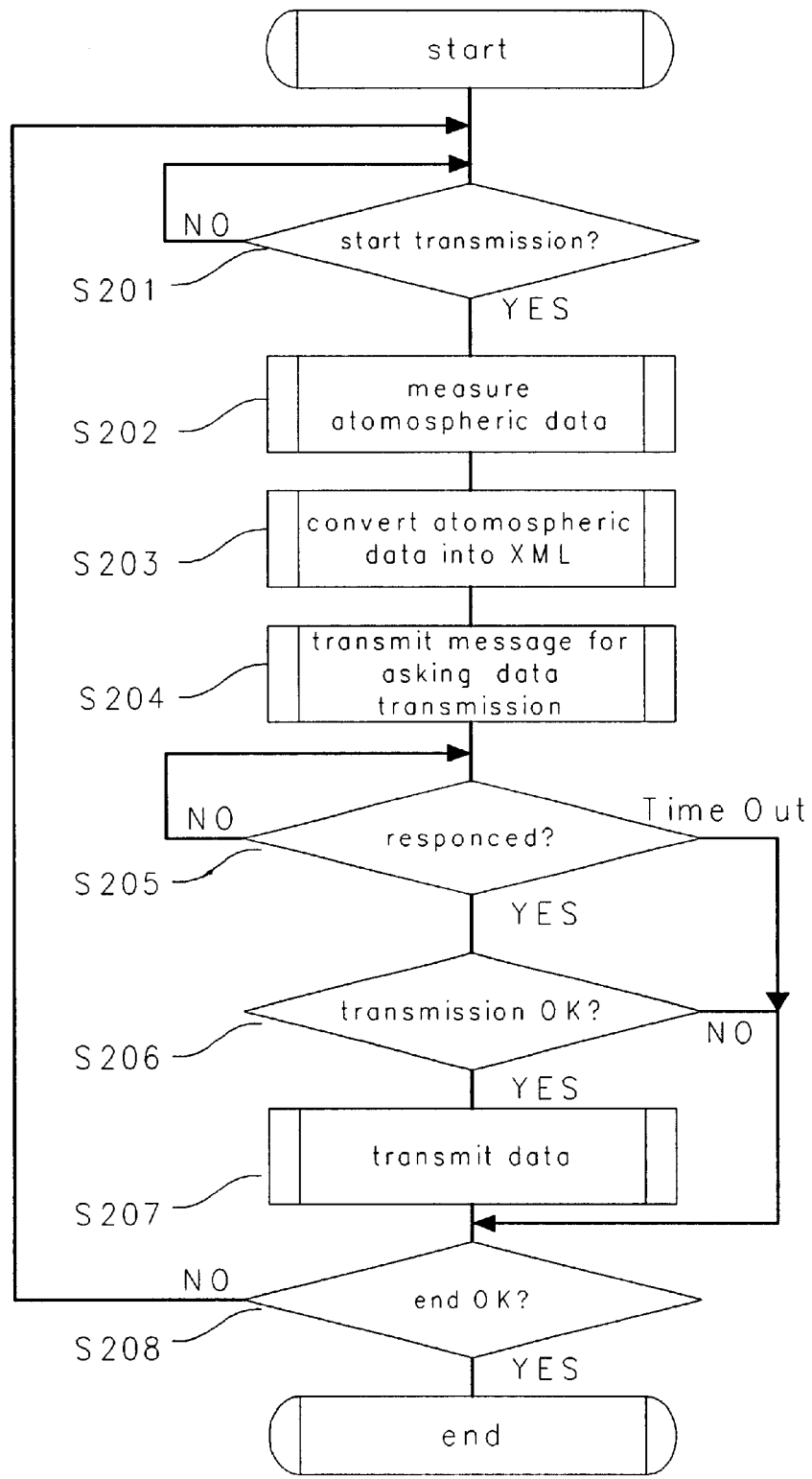
FIG. 2 is a flowchart illustrating a data transmission procedure in accordance with a first exemplary embodiment of the present invention.

FIG. 2 is a flowchart illustrating a data transmission procedure in data transmitter 100. Described in this flowchart is an example of real-time data transmission in which data measurement is performed using sensor 103 and instrument data processor 105, the instrument data is formatted in meta data processor 106, and then the data is transmitted to data-receiving server 201 via communication unit 108 without being accumulated in data memory 107.

In step S201, if predetermined data transmission start conditions are satisfied or not is determined. When the conditions are satisfied, the procedure goes to step 202 so that data transmission is started. The data transmission start conditions can be arbitrary ones including the following cases:
 (i) where data transmission time is predetermined and the time is reached; and
 (ii) where data transmissions request is given by data-receiving server 201.
Of Course, Data Transmission Can be Always Performed by Omitting Step 201 of determining if data transmission start conditions are satisfied.

Step S202 is a data-measuring step, which corresponds to data acquisition of instrument data processor 105 from sensor 103. The instrument data is not only acquired but also can be analyzed and the analysis results can be used as data measurements.

Next, in step 203, the instrument data are formatted into text data with tags. It is desirable that a standardized extensible data description language, such as the XML, is used as a data format, considering general versatility.

FIG. 3 shows an example of formatted data measured in step S202. In this example, instrument data are combined on measuring time basis and formatted into text data with tags.

In step S204, data transmitter 100 sends to data-receiving server 201 a message requesting a permission of data transmission. This message includes information for data-receiving server 201 on whether to permit or refuse data transmission. Such information includes kinds of data (static image data, motion image data, instrument numerical data), a data size, data transfer rate, and data transfer method (file transfer or real-time transfer).

In step S205, the transmitter waits for a response to the message requesting a permission of data transmission sent in step S204, which is to be given from data-receiving server 201. When no response is given within a predetermined period of time, the procedure goes to step S208 for time-out processing. When a response from data-receiving server 201 is given, the procedure goes to step S206.

In step S206, the response from data-receiving server 201 is checked. When the response is a permission of data transmission, the procedure goes to step S207 and data transmission to data-receiving sever 201 is executed. When the response is a refusal of data transmission, data transmission is cancelled and the procedure goes to step S208. When the data transmission is cancelled, the instrument data may be abandoned immediately. Alternatively, the instrument data may temporarily be stored and transmitted together with the next instrument data.

In step S208, whether predetermined end conditions are satisfied or not is determined. When the end conditions are not satisfied, the procedure returns to step S201 and a series of steps are repeated. When the end conditions are satisfied, data transmission is completed. For example, when data transmitter 100 is set to execute data transmission from 6 a.m. to 6 p.m., the predetermined end condition in this case is "it has passed 6 p.m."

As mentioned above, a series of steps S201 to S208 allow the data measured in data transmitter 100 to be transmitted to data-receiving server 201.

In FIG. 2, when the amount of data transmitted to data-receiving server 201 is small and the load on data-receiving server 201 or network 301 is small, steps S204 to S206 can be omitted.

FIG. 2 describes real-time transmission in which data is not accumulated in data memory 107 and direct data transmission is performed. However, it is also possible to accumulate in data memory 107 the data measured within a predetermined period of time and perform a file transfer of the accumulated data at a time. The information on which method to perform, real-time transfer or file transfer, is transmitted in step S204.

Figure 4:
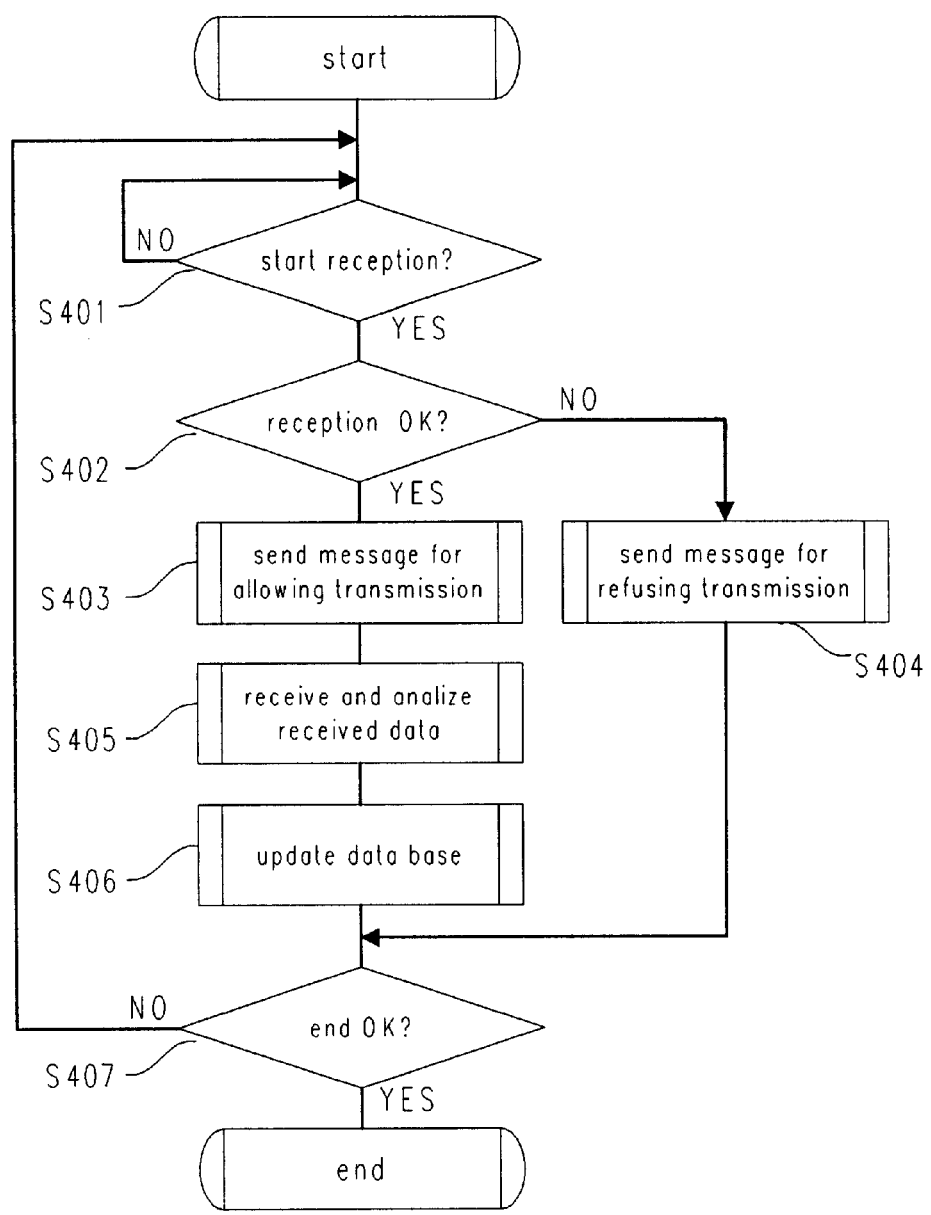
FIG. 4 is a flowchart illustrating a data reception procedure in accordance with the first embodiment of the present invention.

FIG. 4 is a flowchart illustrating a data receiving procedure executed in data-receiving server 201.

Step S401 is a step of determining whether to start data reception. In this step, if a message data transmitter 100 has sent in step S204 is received or not is checked. When a message has been received, the procedure goes to step S402. When no message has been received, the data-receiving server continues to wait for a massage from transmitter 100 in the loop in step S401.

In step S402, the message received from transmitter 100 is analyzed, and whether or not to permit data transmission from transmitter 100 is determined. The criteria of determination are arbitrary. For instance, in a case where the load on data-receiving server 201 is heavy or securing resources for data reception is difficult, data transmission is refused. In other cases, data transmission is permitted. Moreover, authorization of data transmitter 100 can be combined with data transmission and data transmission from unauthorized transmitter 100 can be refused.

When transmitter 100 is permitted to transmit data in step S402, the procedure goes to step S403. When the transmitter is refused to transmit data, the procedure goes to step S404.

In step S403, after data-receiving server 201 has prepared for data reception, the communication control unit 207 transmits to transmitter 100 a message for permitting data transmission therefrom and then the procedure goes to step S405. On the other hand, in step S404, data-receiving server 201 transmits to transmitter 100 a message for refusing data transmission therefrom and then the procedure goes to step S407 of determining whether to end.

In step S405, the data-receiving server receives the data that have been transmitted from data transmitter 100, analyzes the received data, and then the procedure goes to step 406. In step S406, the data-receiving server stores in database 204 the received data that have been analyzed in step S405. These received data are text data with tags as shown in FIG. 3 and shaped into a format appropriate for data search.

When no data is transmitted within a predetermined period of time although a permission of data transmission is given to data transmitter 100, the communication control unit 207 performs error processing and the procedure goes to step S407. This processing is not shown in the drawing.

Step S407 is a step of determining whether to end. In this step, if predetermined end conditions are satisfied or not is determined. When the end conditions are not satisfied, the procedure returns to step S401 and a series of steps are repeated. When the end conditions are satisfied, data transmission is completed. Similar to step S208, when data-receiving server 201 is set to operate from 6 a.m. to 6 p.m., the predetermined end condition is "it has passed 6 p.m."

When data-receiving server 201 can receive data from a plurality of data transmitters 100, the data-receiving server is made to execute the steps S405 and 406 in parallel for each of data transmitters 100.

As mentioned above, when the data transmission/reception system executes processing as shown in the flowcharts of FIGS. 2 and 3, the load of received data analysis on data-receiving server 201 can be alleviated because data transmitter 100 formats instrument data into text data with tags before transmitting them to data-receiving server 201. In addition, since the text data with tags are less system-dependable, cooperation and exchange of such data with other systems are easy.

The first embodiment can be used as a multi-point meteorological observation system, for example. Meteorological observation terminals corresponding to data transmitters 100 are distributed in many places and are connected to a meteorological data collecting server corresponding to data-receiving server 201 via communication network 301. The meteorological observation terminals regularly measure observation data, such as air temperature, humidity, wind velocity, precipitation and seismic intensity, at sensor 103 and transmit the instrument data to the meteorological data collecting server. On the other hand, the meteorological data collecting server accumulates the received data in database 204.

This system is characterized in that the meteorological data collecting server can accumulate the data without formatting because the instrument data are transmitted as formatted text data with tags from meteorological observation terminals.

This embodiment can also be constructed as a multi-point meteorological observation system that collects instrument data described by the hyper text markup language (HTML), automatically generates a Web page concerning to meteorological data, and immediately uploads them to the Internet.

2. Second Exemplary Embodiment

In this embodiment, data transmitter 100 transmits to data-receiving server 201 static image data, the meta data thereof, and no instrument data of sensor 103.

Figure 5:
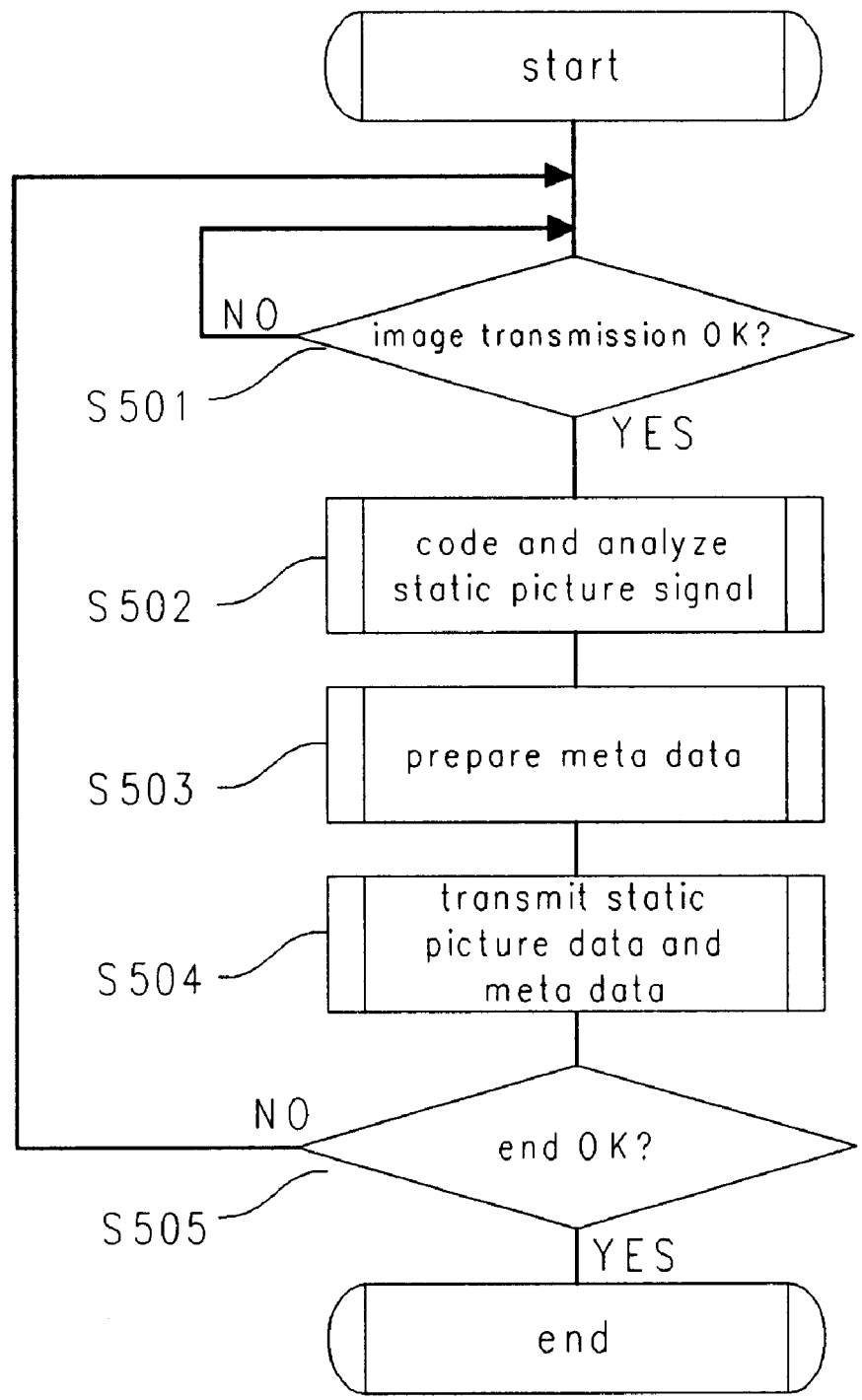
FIG. 5 is a flowchart illustrating a procedure for generating static image data in accordance with a second exemplary embodiment of the present invention.

FIG. 5 is a flowchart illustrating a procedure for generating static image data. In step S501, if conditions for starting static image data transmission are satisfied or not is determined. In this step, if predetermined conditions for starting static image data transmission are satisfied or not is determined. When the conditions are satisfied, the procedure goes to step 502 so that static image data transmission is started. For example, when data transmitter 100 is set to transmit data at regular time intervals, data transmission starts at the predetermined time.

Step S502 is an image encoding step and executed in image processor 104. Image processor 104 encodes picture signals supplied from camera 102 to generate static image data, and feeds them into data memory 107. In step S502, the image processor also performs image analysis to detect if static image data contain such moving bodies as a person or not, and outputs the result thereof to meta data processor 106 together with image attribute information (e.g. the name of a image data file, encoding scheme of the image, width and height of the image, and recording time of the image data).

Step S503 is a meta data generation step, in which meta data concerning to the image data is generated using image attribute information and image analysis results generated in step S502. The generated meta data are fed into data memory 107 and the procedure goes to step S504. FIG. 6 shows an example of meta data generated in step S503.

Step S504 is an image data and meta data transmission step. This step is detailed afterwards.

Step S505 is a step of determining whether to end, in which if predetermined end conditions are satisfied or not is determined after the completion of step S504. When the end conditions are not satisfied, the procedure returns to step S501 and a series of steps are repeated. When the end conditions are satisfied, data transmission is completed.

Next, step S504 is detailed below with reference to FIG. 7.

Each of steps S701 to 703 is preprocessing for meta data transmission and executed in communication control unit 109. In step S701, the communication control unit 109 transmits to data-receiving server 201 a message for informing that meta data transmission is about to start. In step S702, the communication control unit 109 waits for a response to the message, which is to given from data-receiving server 201. There are two kinds of responses from data-receiving server 201, i.e. "permission of meta data transmission" and "refusal of meta data transmission". When no response is received within a predetermined period of time, a heavy load on data-receiving server 201 or communication network 301 is considered and the meta data transmission is cancelled. When a response is received, the procedure goes to step S703.

Step S703 is a response-checking step. When the response from data-receiving server 201 is a permission of meta data transmission, the procedure goes to step S704. When the response is a refusal, the data transmission is cancelled. In step S704, meta data transmission to data-receiving server 201 is executed.

Each of steps S705 to 707 is preprocessing for image data transmission and executed in communication control unit 109. In step S705, the communication control unit 109 sends to data-receiving server 201 a message for informing that image transmission is about to start. In step S706, the communication control unit 109 waits for a response to the message, which is to be given from data-receiving server 201. When no response is received within a predetermined period of time, a heavy load on data-receiving server 201 or communication network 301 is considered and the data transmission is cancelled. When a response is given from data-receiving server 201, the procedure goes to step S707.

Step S707 is a response-checking step. When the response from data-receiving server 201 is a permission of image data transmission, the procedure goes to step S708. When the response is a refusal, the data transmission is cancelled.

Step S708 is an image data transmission step, in which image data transmission to data-receiving server 201 is executed.

Figure 7:
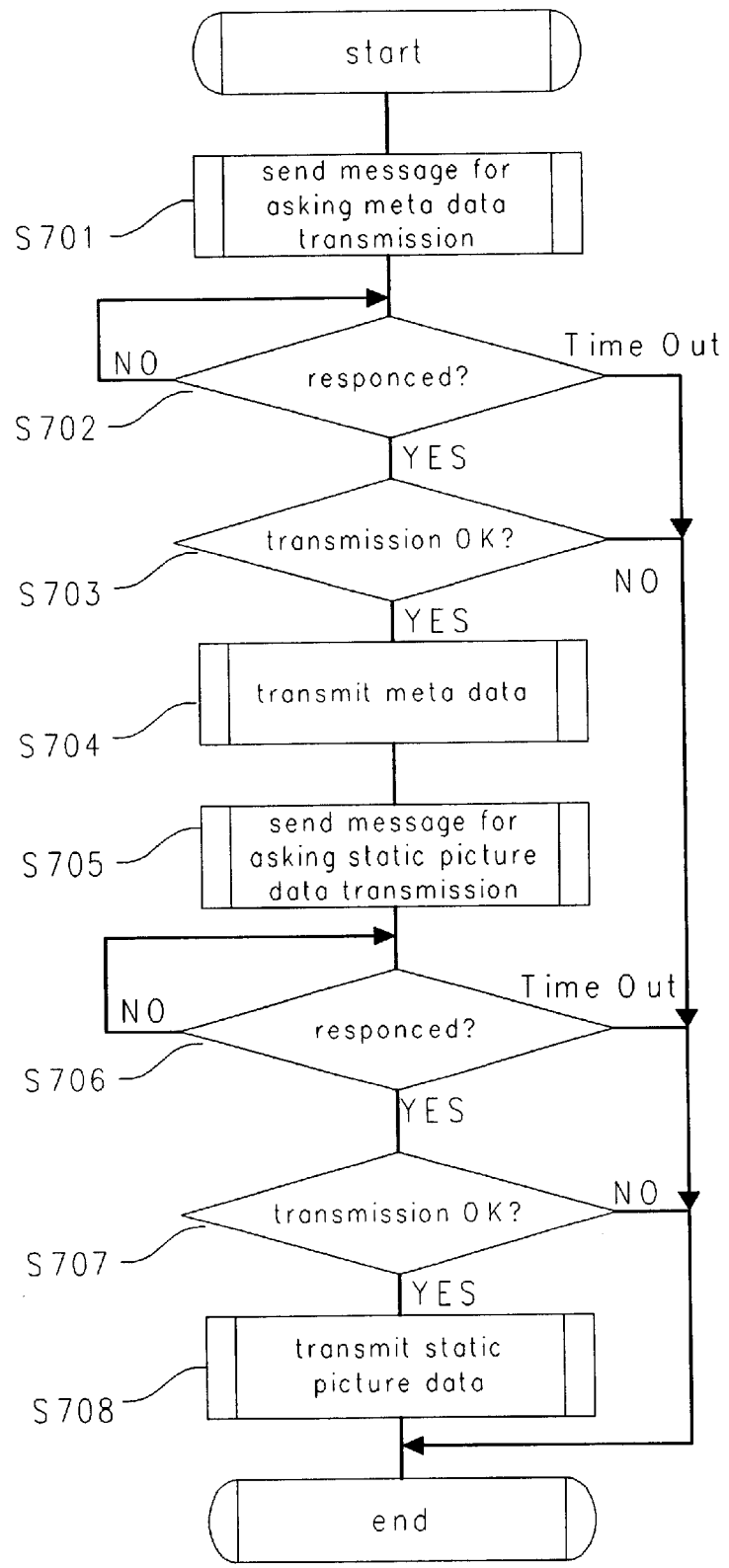
FIG. 7 is a flowchart illustrating a procedure for transmitting meta data and static image data in accordance with the second embodiment of the present invention.

In FIG. 7, when the amount of data transmitted to data-transmitting server 201 is small and the load on data-receiving server 201 and network 301 is small, steps S701 to S703 and steps S706 and 707 can be omitted and meta data and image data can be transmitted to the server without confirmation.

Figure 8:
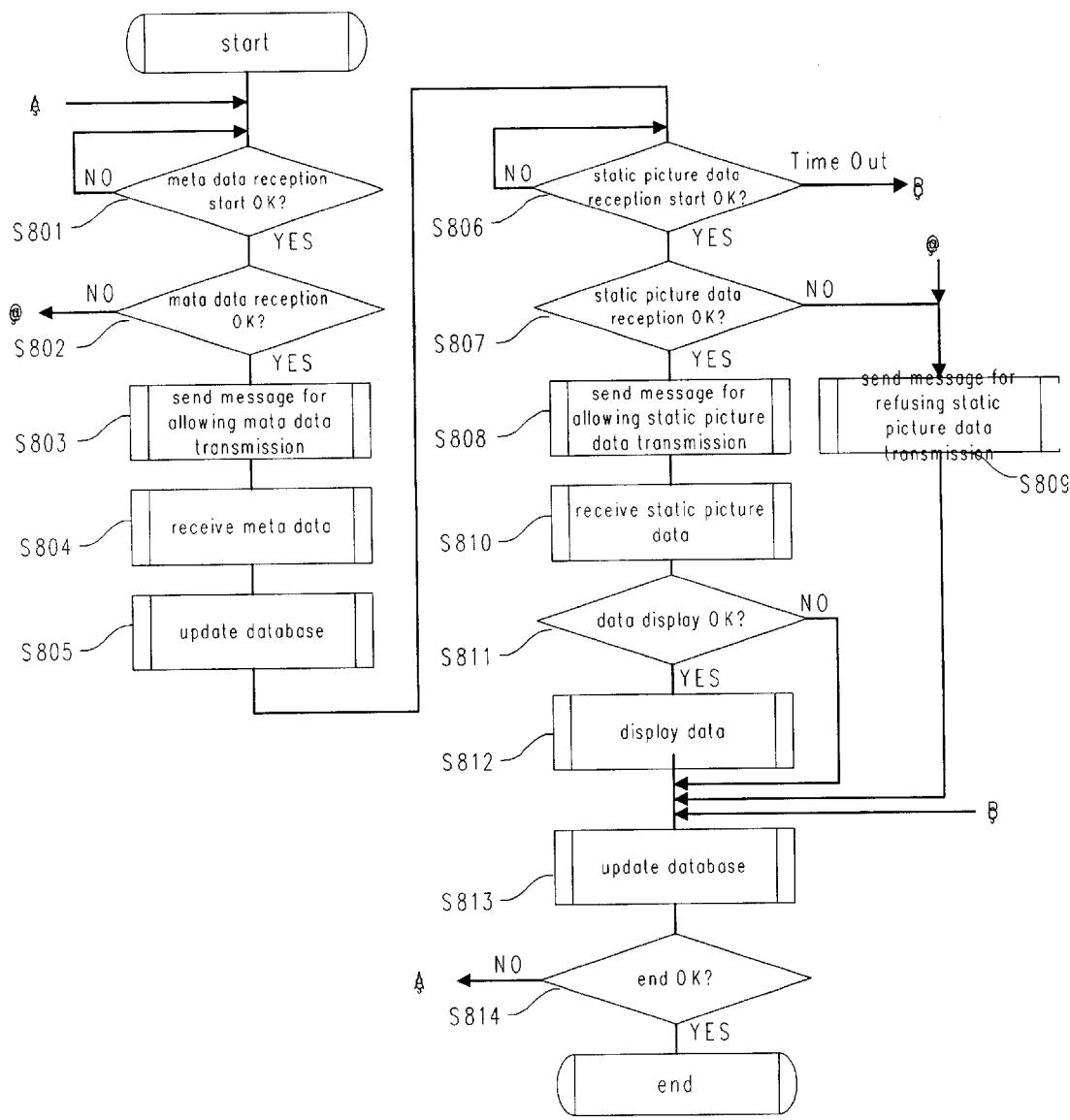
FIG. 8 is a flowchart illustrating a procedure for receiving meta data and static image data in accordance with the second embodiment of the present invention.

FIG. 8 is a flowchart illustrating a meta data and image data receiving procedure executed in data-receiving server 201. Each of steps S801 to 803 and 809 is preprocessing for meta data reception and executed in communication control unit 207.

In step 801, the communication control unit 207 checks if a communication message has been received from data transmitter 100 or not. When a message has been received, the procedure goes to step S802. When no message has been received, the control unit continues to wait for a communication massage from transmitter 100 in the loop in step S801.

In step S802, the communication control unit 207 analyzes the message received from transmitter 100 and determines whether or not to permit data transmission therefrom. The criteria of determination are arbitrary. For example, in the case where the load on data-receiving server 201 is heavy or securing resources for data reception is difficult, data transmission is refused. In other cases, data transmission is permitted. Moreover, data transmission from unauthorized transmitter 100 can be refused. When the communication control unit 207 determines to permit data transmission from transmitter 100 in step S802, the procedure goes to step S803. When the communication control unit 207 determines to refuse the data transmission, the procedure goes to step S809.

Step S803 is a step of notifying a permission of data transmission. After data-receiving server 201 has prepared for data reception, the communication control unit 207 sends to transmitter 100 a message for permitting meta data transmission therefrom.

Step S804 is a meta data reception step, in which data-receiving server 201 receives meta data (see FIG. 6) from data transmitter 100, and analyzes them. When no data is transmitted within a predetermined period of time although a permission of data transmission is given to data transmitter 100, the communication control unit 207 performs error processing (not shown).

Step S805 is a database-updating step, in which the meta data analyzed in step S804 is stored in database 204.

Each of steps S806 to 809 is preprocessing for image data reception and executed in communication control unit 207.

In step 806, the communication control unit 207 checks if a communication message has been received from data transmitter 100 or not. When a message has been received, the procedure goes to step S807. When no message has been received, the communication control unit 207 continues to wait for a communication massage from transmitter 100 in the loop in step S806. However, when no communication message is received from data transmitter 100 within a predetermined period of time, the communication control unit 207 performs error processing and the procedure goes to step 813.

Step S807 is a step of determining whether to receive data, in which the communication control unit 207 analyzes the message received from transmitter 100 and determines whether or not to permit data transmission from transmitter 100. When the communication control unit 207 determines to permit data transmission from transmitter 100, the procedure goes to step S808. When the communication control unit 207 determines to refuse the data transmission, the procedure goes to step S809.

Step S808 is a step of notifying a permission of data transmission. Similar to step S803, in this step, after data-receiving server 201 has prepared for data reception, the communication control unit 207 sends to transmitter 100 a message for permitting data transmission therefrom.

Step S809 is a step of notifying a refusal of data transmission. In this step, the communication control unit 207 sends to data transmitter 100 a message for refusing the data transmission therefrom and the procedure goes to step S813. In this case, since the received meta data, i.e. the meta data concerning to the image data of which transmission is refused, is unnecessary, the meta data is deleted from database 204.

Step S810 is a image data reception step, in which data-receiving server 201 receives static image data or motion image data from data transmitter 100 and temporarily accumulates them in a temporary memory, and the procedure goes to step S811. When meta data have been received and no image data is transmitted from data-transmitting terminal 101 within a predetermined period of time although a permission of image data transmission is given to data transmitter 100, data reception is cancelled and the procedure goes to step S814.

In step S811, the data-receiving server 201 analyzes the meta data received in step S804 and determines if the meta data satisfy predetermined data display conditions or not. When the data display conditions are satisfied in step S811, the procedure goes to step S812. When the data display conditions are not satisfied, the procedure goes to step S813. The data display conditions are arbitrary. For example, when image analysis results or instrument data are found abnormal or data including significant information exist, the data are displayed. This prevents inadvertent failure in checking abnormal data and data including significant information.

Step S812 is a data display step, in which the image data received in step S810 are decoded, the meta data received in step S804 are converted into user-readable information and fed into display 202.

Step S813 is a database-updating step, in which the image data received in step S810 are stored in database 204. When the image data is not normally received, the stored meta data concerning to the image data are abandoned.

Step S814 is a step of determining whether to end, in which if predetermined end conditions are satisfied or not is determined. When the end conditions are not satisfied, the procedure returns to step S801 and a series of steps are repeated. When the end conditions are satisfied, data transmission is completed.

With this embodiment, attribute information attached to image data is formatted into meta data in data transmitter 100, and the meta data and image data are separately transmitted to data-receiving server 201. This alleviates the load of received data analysis on data-receiving server 201, facilitates image data accumulation and search in the database, and moreover enhances the general versatility of the data.

This embodiment can be utilized as an image data collecting system using monitoring cameras, for example.

Camera terminals corresponding to data transmitters 100 are distributed in many different places and are connected to an image data collecting server corresponding to data-receiving server 201 via communication network. Each of the camera terminals regularly generates image data and the meta data thereof and transmits them to the image data collecting server.

On the other hand, the image data collecting server accumulates the received image data and meta data into its database without reprocessing. Including the encoding scheme of the image data, data size, imaging positions of fixed cameras, imaging time, and image analysis results, the meta data can be used for searching image data.

Accumulation of such meta data including the description of image data attributes together with image data facilitates the update of image database. Therefore, this embodiment is appropriate for a data-collecting system involving recording by image data, for observation of natural phenomena (e.g. volcanic activities) and animals and plants, astronomical observation, measurement of volume of traffic, and the like.

3. Third Exemplary Embodiment

This embodiment relates to a monitoring and observation system that transmits and receives static image data including significant information. This embodiment can be applied to an invader detection system and other crime prevention purposes.

Figure 9:
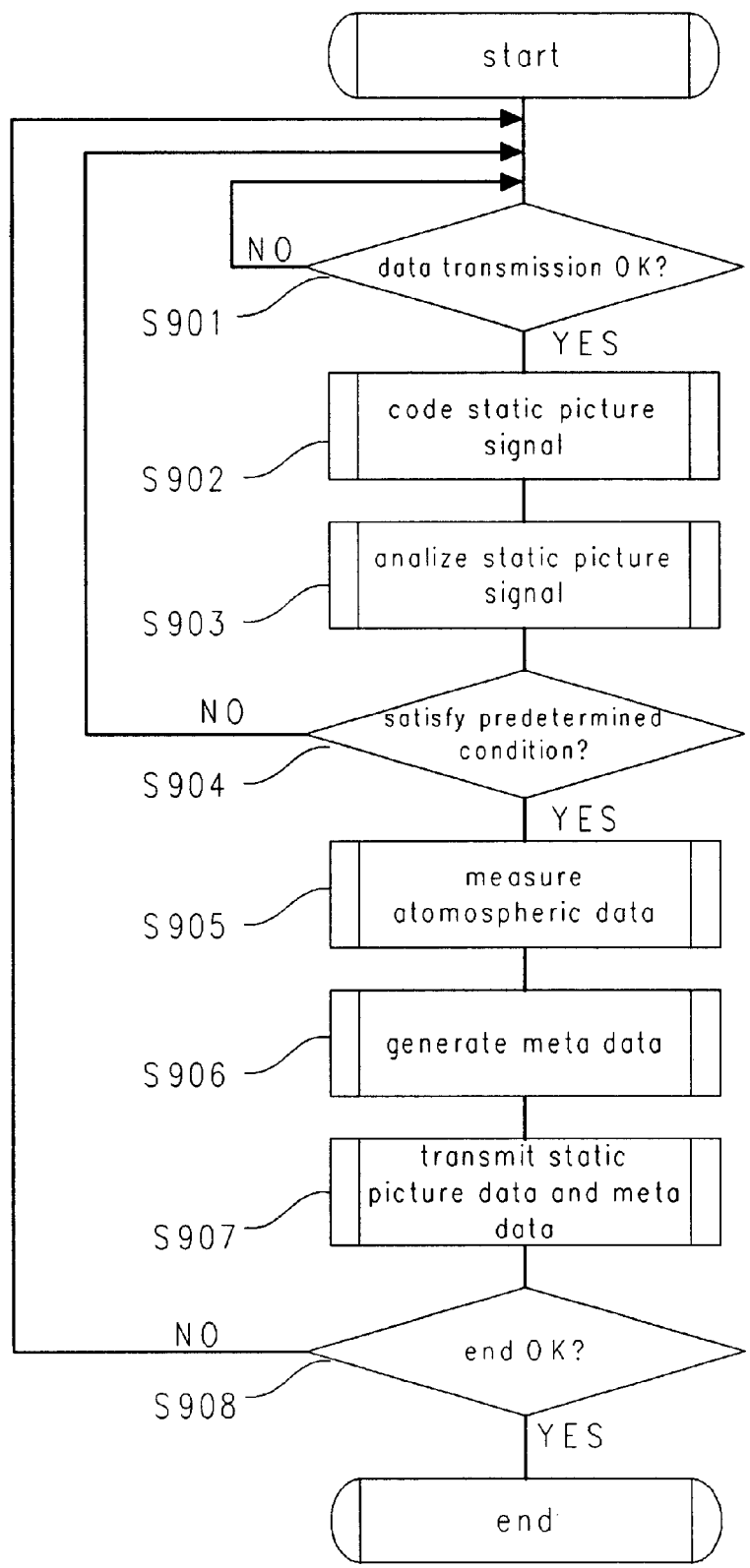
FIG. 9 is a flowchart illustrating a data transmission procedure in accordance with a third exemplary embodiment of the present invention.

FIG. 9 is a flowchart illustrating a data transmission procedure in case that picture analized results of the data transmitter 100 satisfy predetermined conditions.

In FIG. 9, step S901 is processing for determining if predetermined conditions for starting data transmission are satisfied or not. When the conditions are satisfied, the procedure goes to step 902 so that data transmission is started. For example, when data transmitter 100 is set to transmit data at five-second intervals, the condition for starting data transmission is "five seconds has elapsed since previous data measurement".

In step S902, image processor 104 encodes picture signals supplied from camera 102 to generate static image data. The generated image data are accumulated in data memory 107 and the attribute information of the image data is fed into meta data processor 106.

In step S903, the image data generated in step S902 are analyzed and the image analysis results are fed into meta data processor 106. In this embodiment, it is assumed, for the description of the following steps, that the image analysis operation is "detection of a person in the image" and the analysis results are supplied as "existence/non-existence of a person".

Step S904 is a step of checking an image analysis results, in which if the image analysis results supplied in step S903 satisfy predetermined conditions or not is determined. When the conditions are satisfied, the procedure goes to step S905. When the conditions are not satisfied, the procedure returns to step S901. The determining condition to be satisfied is "existence of a person".

Step S905 is a data-measuring step, which corresponds to data acquisition of instrument data processor 105 from sensor 103. The instrument data is not only acquired but also can be analyzed and the analysis results can be used as data measurements. After the completion of step S905, the procedure goes to step S906.

Step S906 is a meta data generation step. In this step, meta data concerning to the image data are generated using the attribute information of the image data generated in step S902, the image analysis results generated in step S903, and the instrument data generated in step S905. The generated meta data are accumulated in data memory 107, and the procedure goes to step S907.

FIG. 10 shows an example of meta data supplied from data transmitter 100. The meta data include the name of an image data file, encoding scheme of the image, width and height of the image, imaging date, identifier of a camera used, detection of a person, detection results of an infrared sensor, measurements of a weight sensor.

Step S907 is an image data and meta data transmission step. Since the details are the same as those shown in FIG. 7, the description is omitted.

After the completion of steps S907, if predetermined end conditions are satisfied or not is determined in step S908. When the conditions are not satisfied, the procedure returns to step S901 and a series of steps are repeated. When the conditions are satisfied, the data transmission is completed.

On the other hand, since the procedure for data reception in data-receiving server 201 is the same as that shown in FIG. 8, the description is omitted.

In this embodiment, since the meta data transmitted from data transmitter 100 include image data analysis results, data-receiving server 201 need not execute image analysis. This alleviates the load on the data-receiving server 201.

In addition, image data can be searched from database 204 using the image analysis results as a key. Similarly, since the meta data include instrument data acquired at the same time as the generation of the image data, the image data can be searched from the database using the instrument data as a key.

Furthermore, only when the image analysis results satisfy predetermined conditions, data transmission is executed. This can effectively reduce the amount of image data accumulated in database 204 and alleviate the load on data-receiving server 201 and network 301.

This embodiment can be used as an invader monitoring system using fixed cameras, for example. Monitoring camera terminals corresponding to data transmitter 100 are distributed at the positions to be monitored and connected to a monitoring center via communication network. Each of the monitoring camera terminals always performs image analysis operation, and transmits image data and the meta data thereof to the monitoring center only when existence of a person is detected in the image. Therefore, in the monitoring center, an operator need not focus on the monitoring operation all the time and can check the image data only when image data is transmitted from the monitoring camera terminals.

In addition, this embodiment can be used as a vehicle monitoring system. This system reads license plates on running vehicles to be monitored and transmits image data to a monitoring center only when the vehicle bearing a specified license plate is detected.

4. Fourth Exemplary Embodiment

In this embodiment, when instrument data in data transmitter 100 satisfies predetermined conditions, static image data and the meta data thereof are transmitted to data-receiving server 201. In this embodiment, image processing in camera 102 and image processor 104 and data measurement in sensor 103 and instrument data processor 105 are executed in parallel.

Figure 11:
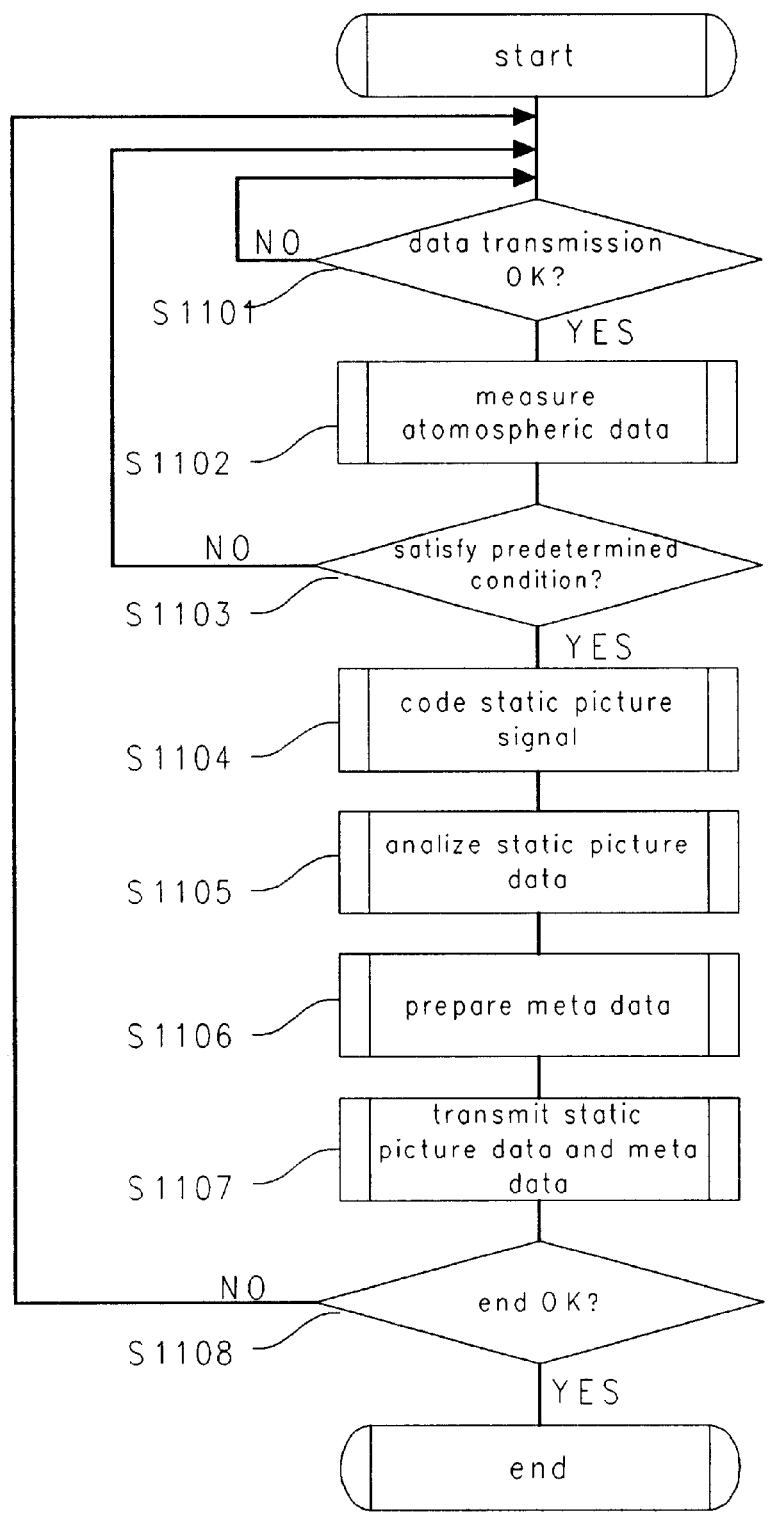
FIG. 11 is a flowchart illustrating a data transmission procedure in accordance with a fourth exemplary embodiment of the present invention.

In FIG. 11, step S1101 is processing for determining if predetermined conditions for starting data transmission are satisfied or not. When the conditions are satisfied, the procedure goes to step S1102 so that data transmission is started. When data transmitter 100 is set to perform data measurement at five-second intervals, for example, the predetermined condition for starting data transmission is "five seconds have elapsed since previous data measurement".

Step S1102 is a data-measuring step, which corresponds to data acquisition of instrument data processor 105 from sensor 103. In this case, the instrument data is not only acquired but also can be analyzed and the analysis results can be used as data measurements. After the completion of step S1102, the procedure goes to step S1103.

In step S1103, if the instrument data supplied in step S1102 satisfy predetermined conditions or not is determined. When the conditions are satisfied, the procedure goes to step S1104. When the conditions are not satisfied, the procedure returns to step S1101. An example of the conditions of the instrument data is as follows: temperature data is acquired using a temperature sensor as sensor 103 and "the measured temperature is 30° C. or more".

In step S1104, picture signals are fed into image processor 104, in which image data are encoded to generate static image data and image attribute information. The generated image data is accumulated in data memory 107, the image attribute information is supplied to meta data processor 106, and the procedure goes to step S1105.

In step S1105, the image data generated in step S1102 are analyzed. The image analysis results of the image data are fed into meta data processor 106. Step S1105 is not essential and it can be omitted.

In step S1106, meta data concerning to the image data are generated using the image attribute information generated in step S1104, the image analysis results generated in step S1105, and the instrument data generated in step S1102, and then fed into data memory 107. Thereafter, the procedure goes to step S1107. An example of the meta data is as shown in FIG. 10.

Step S1107 is an image data and meta data transmission step. Since the details of this step are the same as the flowchart of FIG. 5, the description is omitted. After the completion of step S1107, the procedure goes to step S1108.

In step S1108, if predetermined end conditions are satisfied or not is determined. When the conditions are not satisfied, the procedure returns to step S1101 and a series of steps are repeated. When the conditions are satisfied, data transmission is completed.

On the other hand, since the procedure for data reception in data-receiving server 201 is the same as that of FIG. 8, the description is omitted.

In this embodiment, data transmission is performed only when the instrument data satisfy predetermined conditions. This can efficiently reduce the amount of image data accumulated in database 204 and alleviate the load on data-receiving server 201 and network 301.

In addition, since the meta data include instrument data acquired at the same time as the generation of the image data, the image data can be searched from database 204 using the instrument data as a key.

This embodiment can be used as a system for recording a person's entry into/exit from a room. Monitoring terminals (corresponding to data transmitters 100) that incorporate sensors (e.g. an infrared sensor or a weight sensor) for detecting a person's entry into/exit from a room and imaging cameras are distributed at a doorway of each room in a building. The monitoring terminals are connected to an image-recording server (corresponding to data-receiving server 201) via communication network. When sensor responds, the monitoring terminal acquires the image data of a person who enters into or exits from the room and transmits the image data together with the meta data thereof. The image-recording server accumulates the received image data and the meta data thereof in its database. Since the meta data include the image recording time and analysis results other than the instrument data acquired by sensors, the image including the person entering in/exiting from the room can easily be searched using this information.

Using sensors with small power consumption and setting the imaging cameras so as to operate only when the sensors respond can reduce the power consumption of the entire system.

5. Fifth Exemplary Embodiment

In this embodiment, motion image data and the meta data thereof are transmitted to data-receiving server 201 when instrument data satisfy predetermined conditions. This embodiment is appropriate for the application to an active volcano observation system. In this embodiment, image processing in camera 102 and image processor 104 and data measurement in sensor 103 and instrument data processor 105 are executed in parallel.

Figure 12:
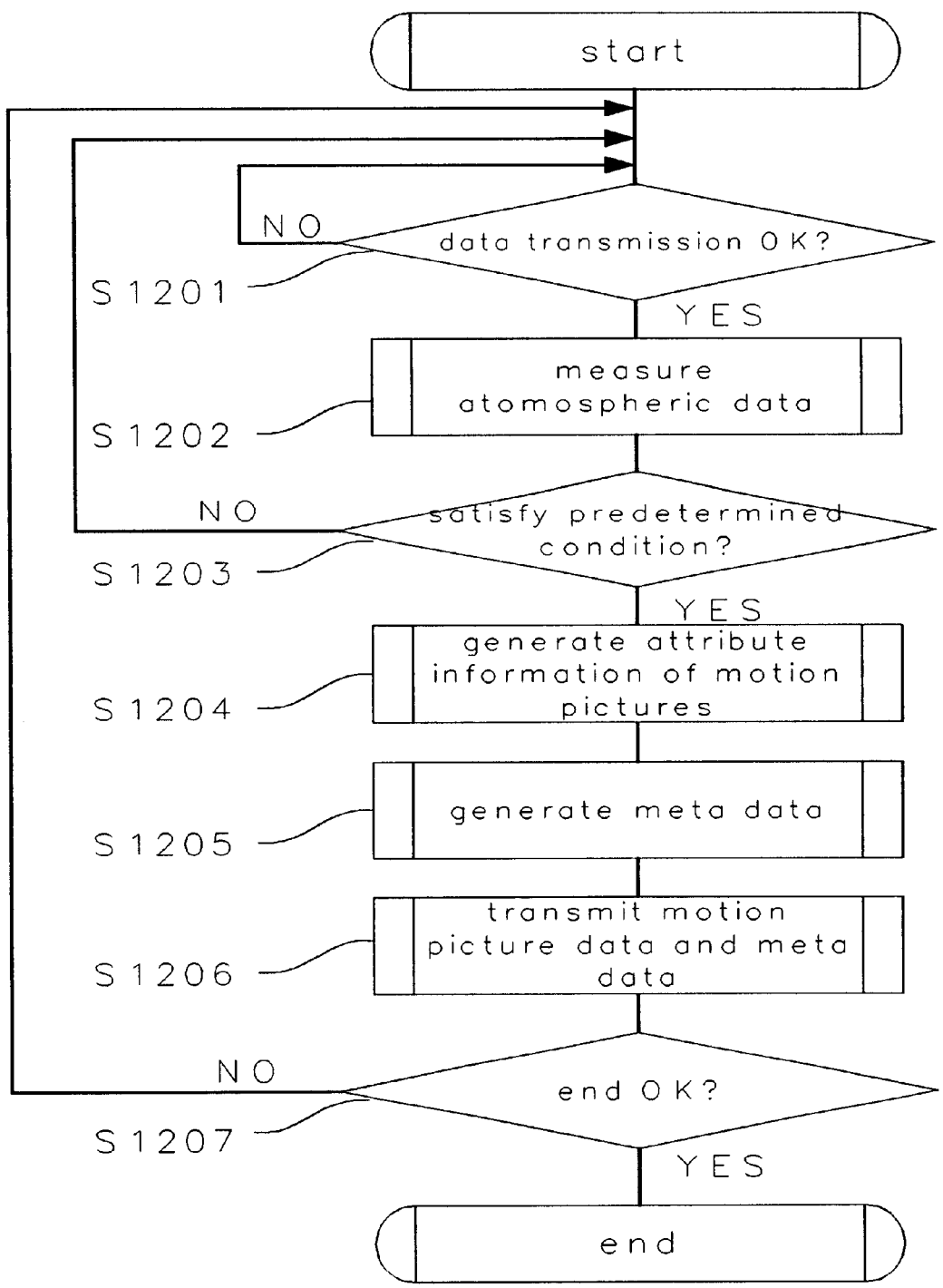
FIG. 12 is a flowchart illustrating a procedure for generating motion image data in accordance with a fifth embodiment of the present invention.

FIG. 12 is a flowchart illustrating a procedure for generating motion image data in case that instrument data analized results of the data transmitter 100 satisfy predetermined conditions.

In FIG. 12, steps S1201 to 1203 are processing for determining if the data measured at sensor 103 satisfy predetermined conditions or not. In this embodiment, sensor 103 is made of a seismometer, thermometer, and hygrometer. These sensors 103 perform data measurement and processing in the steps after S1203 when the seismometer senses an earthquake. Since the details performed in steps S1201 to 1203 are the same as those of steps S1101 to 1103 in FIG. 11, the description is omitted.

In step S1204, image attribute information constituting meta data is generated as preprocessing for motion picture encoding that is to be performed in step S1206.

In step 1205, meta data concerning to the image data are generated using the image attribute information generated in step S1204 and the instrument data generated in step S1202.

FIG. 13 shows an example of meta data supplied from data transmitter 100. The meta data include the name of a image file, encoding scheme of the image, width and height of the image, bit rate, imaging date, identifier of a camera used, measurements of the seismometer, temperature, and humidity.

After the completion of step S1205, the procedure goes to step S1206, in which motion image data and meta data are transmitted. The details are described afterwards.

After the completion of step S1206, if predetermined end conditions are satisfied or not is determined in step S1207. When the conditions are not satisfied, the procedure returns to step S1201 and a series of steps are repeated. When the conditions are satisfied, data transmission is completed.

Figure 14:
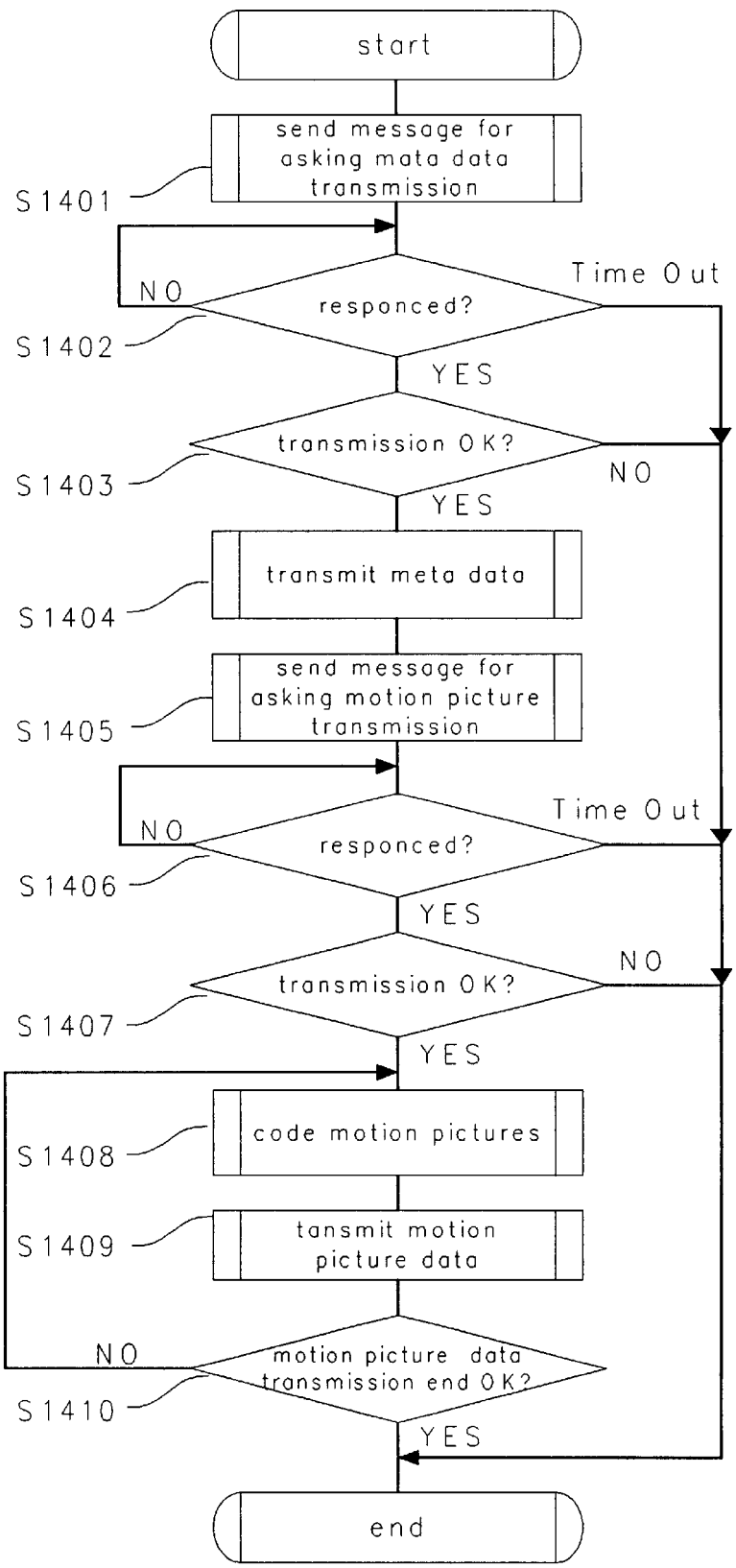
FIG. 14 is a flowchart illustrating a procedure for transmitting meta data and motion image data in accordance with the fifth embodiment of the present invention.

Next, the details of step S1206 are described with reference to FIG. 14. Steps S1401 to 1407 are different from steps S701 to 707 in FIG. 7 in that image data to be transmitted are motion image data instead of static image data, however, basically the same processing is performed in these steps. Therefore, the description is omitted. In steps S1401 to 1407, permission of meta data transmission is confirmed and meta data is transmitted.

Steps S1408 to 1410 are processing for executing real-time transfer of motion image data. Step S1408 is a motion picture encoding step, in which motion picture signals are supplied from camera 102 into image processor 104 and encoded. The motion image data encoded in step S1408 are a frame or a series of a plurality of frames of motion image data.

Step S1409 is a motion image data transmission step, in which motion image data generated in step S1408 are transmitted to data-receiving server 201 via data memory 107 and communication unit 108.

Step S1410 is a step of determining whether to end motion image data transmission, in which if predetermined motion image data transmission end conditions are satisfied or not is determined. When the conditions are not satisfied, the procedure returns to step S1408 and a series of steps are repeated. When the conditions are satisfied, motion image data transmission is completed. For example, when the transmission period of time is set to one minute, transmission of motion image data is stopped after one minute has elapsed since the start of the transmission.

Since the procedure for data reception in data receiving server 201 is basically the same as that shown in FIG. 8 except for some difference between static pictures and motion pictures, the description is omitted.

In this embodiment, data transmission is performed only when the instrument data satisfy predetermined conditions. This can efficiently reduce the amount of motion image data accumulated in database 204 and alleviate the load on data-receiving server 201 and network 301. In addition, when data transmitter 100 is used as a monitoring camera, the burden on an operator who observes the received motion image data in data-receiving server 201 can be eased. Furthermore, since the meta data include instrument data acquired at the same time as the generation of the motion image data, the motion image data can be searched from the database using the instrument data as a key.

In order to use this embodiment as an active volcano observation system using fixed cameras, observation terminals (corresponding to data transmitters 100) that incorporate observation cameras for imaging an active volcano and various sensors, such as a seismometer, are distributed at the positions to be monitored. The terminals are connected to an observation center (corresponding to data-receiving server 201) via communication network. The observation center receives no data from the observation terminals at ordinary times when no earthquake occurs. The observation terminals transmit data to the observation center only when the seismometer senses an earthquake. At this time, the observation terminals transmit to the observation center meta data, i.e. the combination of instrument data acquired by various sensors such as a seismometer. Successively, the observation terminals perform real-time transmission of image data of the active volcano acquired by the observation cameras for a given period of time. Upon receipt of the data from the observation terminals, the observation center gives a warning to the operator and reproduces the received image data and accumulates the image data in the database.

6. Six Exemplary Embodiment

This embodiment is a monitoring and observation system for transmission/reception of temporarily stored motion image data. While the system in accordance with Fifth Exemplary Embodiment performs real-time transfer of motion image data, this embodiment is characterized by transferring temporarily accumulated motion image data.

Figure 15:
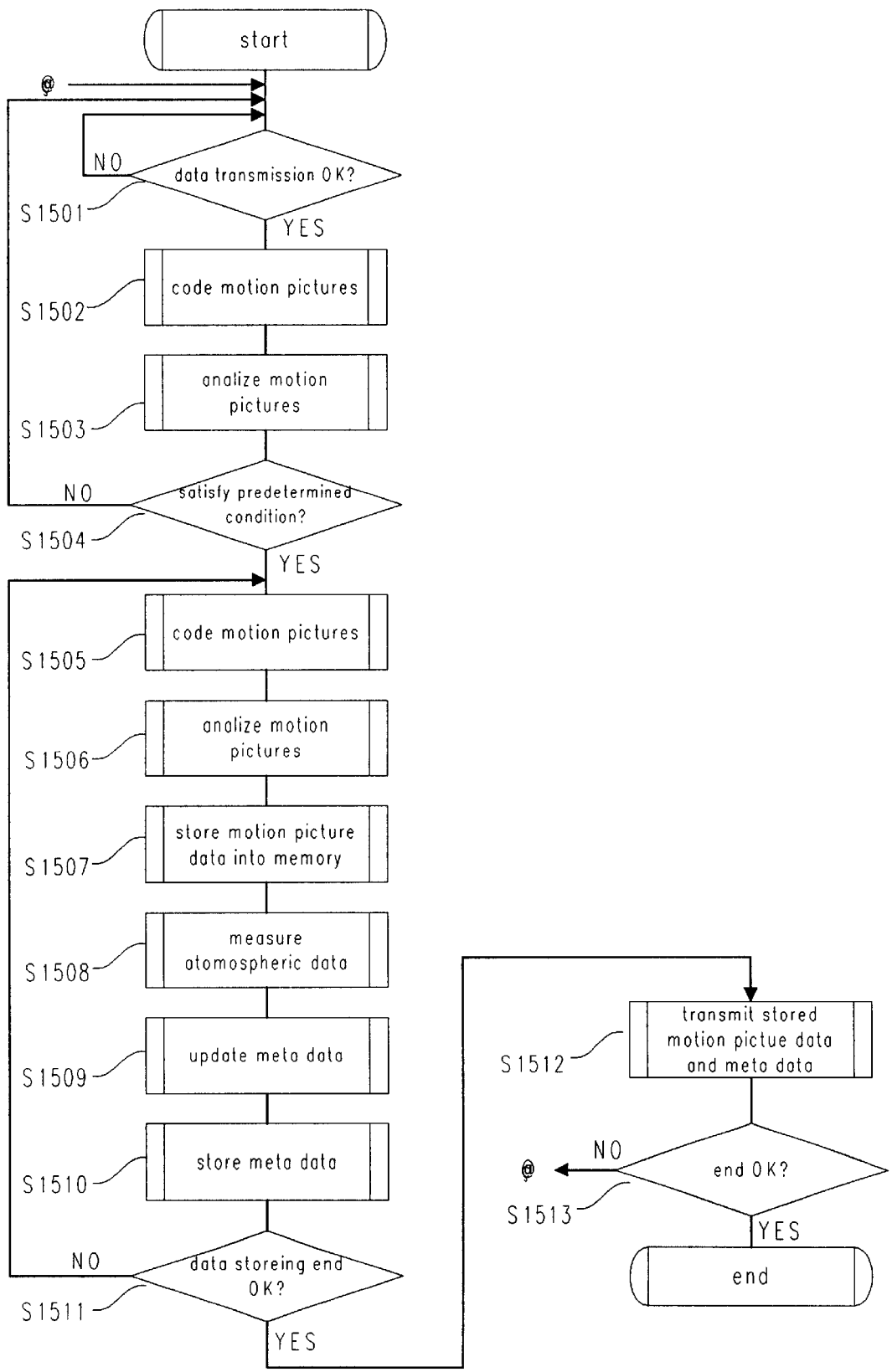
FIG. 15 is a flowchart illustrating a procedure for transmitting meta data and motion image data in accordance with a sixth exemplary embodiment of the present invention.

FIG. 15 is a flowchart illustrating a procedure for transmitting stored meta data and motion image data in case that picture processing results of the data transmitter 100 satisfy predetermined conditions.

In FIG. 15, steps S1501 to 1504 are processing for analyzing image data and determining if the image analysis results satisfy predetermined conditions or not. Since processing performed in steps S1501 to 1504 is basically the same as that performed in steps S901 to 904 of FIG. 9 except for the difference between motion pictures and static pictures, the description is omitted.

Steps S1505 to 1511 are a series of processing for accumulating motion image data and meta data. Step S1505 is a motion picture encoding step, in which picture signals are supplied from camera 102 into image processor 104, a frame of motion image data is encoded, and image attribute information is fed into meta data processor 106. The attribute information includes the name of a motion image data file, encoding scheme, image size and recording time of the motion image data, and bit rate (bps).

Step S1506 is a motion picture analysis step, in which arbitrary image analysis is performed on the motion image data acquired in step S1505. Step S1506 is executed in image processor 104 and the motion picture analysis results are supplied to meta data processor 106. In this embodiment, it is assumed, for the description of the following steps, that the image analysis operation is "detection of a person in the image" and the analysis results are supplied as "existence/non existence of a person".

Step S1507 is a motion image data accumulation step, in which the motion image data generated in step S1505 is accumulated in data memory 107 temporarily.

Step S1508 is a data-measuring step, which corresponds to data acquisition of instrument data processor 105 from sensor 103. The instrument data is not only acquired but also can be analyzed and the analysis results can be used as data measurements. For example, when sensor 103 is a thermometer, air temperature data are data measurements.

Step S1509 is a meta data updating step, in which newly acquired motion picture analysis results and instrument data are added to the meta data being generated. Thus change in the motion picture analysis results and instrument data over time is recorded in the meta data.

Step S1510 is a meta data accumulation step, in which the meta data updated in step S1509 is accumulated in data memory 107. FIG. 16 shows an example of meta data. This meta data include the name of an motion picture file, encoding scheme of the motion picture, width and height of the motion picture, bit rate, imaging date of the motion picture, identifier of a camera used, air temperature data at each measuring time.

Step S15011 is a step of determining whether to end data accumulation, in which predetermined accumulation end conditions are satisfied or not is determined. When the conditions are not satisfied, the procedure returns to S1505 and a series of steps are repeated. When the condition are satisfied, the data accumulation is completed and the procedure goes to step S1512. For example, when the data accumulation end condition is set so that motion image data is recorded for one minute, data accumulation is stopped after one minute has elapsed since the start of accumulation of the motion image data. A series of processing in steps S1505 to 1511 allows motion image data and the meta data thereof to be stored in data memory 107.

Step S1512 is a step of transmitting accumulated motion image data and meta data. Since the procedure is basically the same as that described in FIG. 7 except for the difference between motion pictures and static pictures, the description is omitted.

Step S1513 is a step of determining whether to end, in which if predetermined end conditions are satisfied or not is determined. When the conditions are not satisfied, the procedure returns to S1501 and a series of steps are repeated. When the condition are satisfied, data transmission is completed.

On the other hand, since the data reception procedure performed in data-receiving server 201 is basically the same as that shown in FIG. 8, the description is omitted.

In this embodiment, data transmission is performed only when the instrument data satisfy predetermined conditions.

This can efficiently reduce the amount of image data accumulated in the database. Moreover, the motion image data are not transferred on real-time basis but they are temporarily accumulated together with meta data and then transferred using a reliable transport protocol. This can alleviate constraints to the communication bandwidth and prevent data loss that may occur during transmission/reception of motion image data.

This embodiment can be used as a remote image data recording system that must record high definition images. Camera terminals equipped with recording means having a large data capacity (corresponding to data transmitting-terminals 101) are distributed in many places, and connected to a image recording server (corresponding to data receiving-server 201) via communication network. In real-time transfer of high-definition image data, a wide bandwidth must be secured so as to prevent the lack of data; thus the communication cost is high. In this embodiment, high-definition image data are temporarily accumulated and then transmitted to the image-recording server. When accumulated data are transmitted, real-time transfer need not be performed and the data can be transmitted via inexpensive communication routes.

In each of the above-mentioned embodiments, the data transmission procedure shown in respective flowchart can be implemented as hardware. In addition, all or part of the transmission procedure can be implemented as a software program to simplify the structure of the hardware. Recording this program on a computer-installable recording medium and installing the recording medium into each of a plurality of various computers allow each computer to perform the procedure via software.

As mentioned above, in accordance with the present invention, data transmitter 100 transmits image data to data-receiving server 201 together with the meta data including various kinds of information concerning to the image data. This can alleviate the load of data analysis on data-receiving server 201 and facilitate maintenance of the image database, such as updating data.

In addition, in accordance with the present invention, data transmission is performed only when image analysis results or instrument data satisfy predetermined conditions. This can efficiently reduce the amount of image data accumulated in the database and alleviate the load on data-receiving server 210 and network.

Furthermore, in accordance with the present invention, motion image data and the meta data thereof are accumulated when the instrument data satisfy predetermined conditions, and the accumulated data are transferred on a file transfer basis using a reliable transport protocol. This has advantageous effects of alleviating the constraints to the communication bandwidth and achieving data transmission/reception without any data loss.

What is claimed is:

1. A data transmission/reception system having at least one data-transmitting terminal for transmitting data made of encoded picture signals and a data receiving-server for receiving the data the data-transmitting terminal has transmitted wherein said data-transmitting terminal comprising:
an image processor for encoding externally supplied picture signals into image data and for generating attribute information of the image data;
a meta data processor for generating meta data from the attribute information of the image data supplied from said image processor; and
a communication unit for transmitting the image data supplied from said image processor and the meta data supplied from said data processor; and said data-receiving server comprising:
a database for accumulating the image data and meta data received from said data-transmitting terminal;
a meta data analyzer for analyzing the meta data; and
a data display for displaying the image data and the meta data;
wherein the image data is reproduced only when meta data satisfying predetermined conditions are detected by the meta data analysis in said meta data analyzer.

2. The data transmission/reception system as set forth in claim 1 wherein
said data-receiving server has a data searching unit for searching meta data accumulated in said database and reading out image data corresponding to the searched meta data; and
said data display displays the image data read out by said data searching unit.

3. A data transmitting-terminal for transmitting data made of encoded picture signals comprising:
an image processor for encoding externally supplied picture signals into one of static image data and motion image data and for generating attribute information of the image data;
a data processor for analyzing data that have been measured using at least one arbitrary sensor;
a meta data processor for generating meta data from instrument data supplied from said data processor, and the attribute information of the image data supplied from said data processor, and the attribute information of the image data supplied from said image processor; and
a communication unit for transmitting the image data supplied from said image processor and the meta data supplied from said meta data processor.

4. The data transmitting-terminal as set forth in claim 3 wherein said meta data processor generates meta data compliant with an extensible data description language specification similar to the eXtensible Markup Language (XML).

5. The data transmitting-terminal as set forth in claim 3 wherein the attribute information of the image data includes information acquired through an arbitrary image analysis operation.

6. The data transmitting-terminal as set forth in claim 3 wherein said communication unit transmits data regularly or only when predetermined data transmission conditions are satisfied.

7. The data transmitting-terminal as set forth in claim 6 wherein the data is transmitted in one of (a) a case where image analysis results supplied from said image processor satisfy predetermined conditions and (b) a case where instrument data supplied from said data processor satisfy predetermined conditions.

8. The data transmitting-terminal as set forth in claim 3 further comprising a data memory for temporarily accumulating data to be transmitted wherein
said image processor generates motion image data;
said data memory temporarily accumulates the motion image data supplied from said image processor and the meta data supplied from said meta data processor; and
said communication unit transmits the data accumulated in said data memory.

9. A data transmission method for transmitting one of encoded static picture signals and encoded motion picture signals comprising:

an image processing step of encoding picture signals into one of static image data and motion image data and generating attribute information of the image data;

a data processing step for analyzing data that have been measured using at least one arbitrary sensor;

a meta data processing step of generating meta data from instrument data supplied from said data processor, and the attribute information of the image data supplied in said image processing step; and a data transmission step of transmitting the image data supplied in said image processing step and the meta data supplied in said meta data processing step.

10. The data transmission method as set forth in claim 9 wherein, meta data compliant with an extensible data description language specification similar to the eXtensible Markup Language (XML) is generated in said meta data processing step.

11. A data reception method comprising:

a data reception step of receiving transmitted image data and meta data that have been measured using at least one arbitrary sensor;

a data accumulation step of accumulating the image data and the meta data in a database;

a meta data analysis step of analyzing the meta data; and a data display step of displaying the image data when predetermined conditions are satisfied in said meta data analysis step.

12. A data transmission program comprising:

an image processing step of encoding picture signals into one of static image data and motion image data and generating attribute information of the image data;

a data processing step for analyzing data that have been measured using at least one arbitrary sensor;

a meta data processing step of generating meta data from instrument data supplied from said data processing, and the attribute information of the image data supplied in said image processing step; and a data transmission step of transmitting the image data supplied in said image processing step and the meta data supplied in said meta data processing step.

13. The data transmission program as set forth in claim 12 wherein meta data compliant with an extensible data description language specification similar to the eXtensible Markup Language (XML) is generated in said meta data processing step.

14. A data reception program comprising:

a data reception step of receiving transmitted image data and meta data that have been measured using at least one arbitrary sensor;

a data accumulation step of accumulating the image data and the meta data in a database;

a meta data analysis step of analyzing the meta data; and a data display step of displaying the image data when predetermined conditions are satisfied in said meta data analysis step.

15. A computer-readable recording media having a data transmission program recorded therein comprising:

an image processing step of encoding picture signals into one of static image data and motion image data and generating attribute information of the image data;

a data processing step for analyzing data that have been measured using at least one arbitrary sensor;

a meta data processing step of generating meta data from instrument data supplied from said data processor, and the attribute information of the image data supplied in said image processing step; and a data transmission step of transmitting the image data supplied in said image processing step and the meta data supplied in said meta data processing step.

16. A computer-readable recording media having a data transmission program recorded therein comprising:

an image processing step of encoding picture signals into one of static image data and motion image data and generating attribute information of the image data;

a meta data processing step of generating meta data compliant with an extensible data description language specification similar to the eXtensible Markup Language (XML) from instrument data supplied from said data processor, and the attribute information of the image data supplied in said image processing step; and a data transmission step of transmitting the image data supplied in said image processing step and the meta data supplied in said meta data processing step.

* * * * *